US010978092B2

(12) United States Patent  
Ottogalli et al.

(10) Patent No.: US 10,978,092 B2  
(45) Date of Patent: Apr. 13, 2021

(54) ADJUSTMENT CONTROL FOR ONE OR MORE DEVICES

(71) Applicant: Orange, Paris (FR)

(72) Inventors: François-Gaël Ottogalli, Châtillon (FR); Julien Riera, Châtillon (FR); Franck Roudet, Châtillon (FR); Rozenn Nicol, Châtillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/458,921

(22) Filed: Jul. 1, 2019

(65) Prior Publication Data

US 2020/0005809 A1 Jan. 2, 2020

(30) Foreign Application Priority Data

Jul. 2, 2018 (FR) ...................................... 1856099

(51) Int. Cl.  
*G10L 25/51* (2013.01)  
*H04L 12/28* (2006.01)

(52) U.S. Cl.  
CPC .......... *G10L 25/51* (2013.01); *H04L 12/2803* (2013.01)

(58) Field of Classification Search  
None  
See application file for complete search history.

(56) References Cited

U.S. PATENT DOCUMENTS

2017/0195810 A1* 7/2017 Gonzales, Jr. .......... G06F 16/63  
2018/0099712 A1* 4/2018 Bean ...................... B62D 63/08

FOREIGN PATENT DOCUMENTS

EP  3 312 946  4/2018  
WO  WO 2011/018562  2/2011

OTHER PUBLICATIONS

Search report dated Mar. 28, 2019 in French Application No. 1856099.

\* cited by examiner

*Primary Examiner* — Kenny H Truong  
(74) *Attorney, Agent, or Firm* — Knobbe, Martens, Olson and Bear, LLP

(57) ABSTRACT

The present invention relates to the management of devices (AP1, AP2, AP3) connected to an equipment item (EQ) in an environment (ENV). The equipment item receives and interprets signals from the environment (S1, S2, S3) and, based on an interpretation of the signals, transmits adjustment instructions (C1, C2, C3) to the devices. In particular, there is provided a sound sensor (ANT) connected to the equipment item (EQ), and one or more mechanical members (OM1, OM2) which when actuated for the purpose of adjusting at least one of the devices, causes the emission of a characteristic sound (S1, S2). The equipment item, upon receiving these sound signals from the environment, compares each sound signal to acoustic signatures predefined in a correlation table (TAB) which lists adjustment instructions (C1, C2, ...) according to these acoustic signatures (S1, S2; S1, S3, S4; ...) and transmits an adjustment instruction for a device based on at least one acoustic signature of the table, recognized in the received sound signals.

11 Claims, 3 Drawing Sheets

ADJUSTMENT CONTROL FOR ONE OR MORE DEVICES

The present invention relates to the adjustment control of a device or of a set of devices, for example a network.

Currently, the operation of a device is most often controlled from one or more switches and/or potentiometers, usually each being powered by electricity and including an indicator light or other indicator, which contributes to a high consumption of electricity.

In the case of a set of devices connected in a network, with connected objects which may be for example sensors transmitting data for example by a radio frequency link, it is necessary to provide as many power supply means as there are sensors.

Even if in some situations it is not necessary to supply power to a switch or a potentiometer (for example a switch for a light bulb in a building), it remains necessary to cut chases in a wall in order to wire the switch and connect it to the light bulb.

The present invention improves the situation.

For this purpose, it proposes an installation for managing one or more devices connected to an equipment item in an environment. The equipment item receives and interprets signals from the environment and, based on an interpretation of the signals, transmits adjustment instructions to the devices.

In particular, the installation comprises at least one sound sensor connected to the equipment item, and at least one mechanical member which when actuated for the purpose of adjusting at least one of the devices, causes the emission of a characteristic sound.

The aforementioned equipment is then arranged to:
receive sound signals from the environment,
verify whether a received sound signal contains an acoustic signature of the mechanical member,
and transmit at least one adjustment instruction for a device based on the acoustic signature identified in the received sound signal.

Thus, the present invention uses the sound produced by a mechanical member ("click" sound of a mechanical switch for example), and its detection in particular, to interpret an event related to the production of this sound and to deduce an adjustment instruction for one or more selected devices.

Since the member is mechanical, there is no need to supply it with electric power.

For example, it is possible to:
compare each received sound signal with predefined acoustic signatures in a correlation table, this correlation table listing adjustment instructions according to the aforementioned acoustic signatures,
and transmit at least one adjustment instruction for a device, based on at least one acoustic signature of the table, identified in a received sound signal.

Here, the term "adjustment instruction" means a command issued to a single device, as well as a set of instructions sent to different equipment items of the installation, in order to react to an event related to a plurality of sound signals received from the environment. For example, the sound of a closing door followed by a click of a switch located in the entrance of an apartment can indicate the arrival of an occupant of the apartment and can trigger turning on the lights of at least the entrance, as well as starting up an answering machine in order to play over a speaker the latest messages left on it, turning on a stereo system to play welcoming music, etc.

Thus, the identification of a sound signature can result in issuing a command to a single device, but can also be used to generate a typed event whose interpretation triggers one or more automated processing sequences on computer devices and/or the sending of one or more commands to one or more physical devices.

Furthermore, the term "correlation table" in the above exemplary embodiment is understood to mean a stored record of predefined associations between one or more acoustic signatures and one or more device adjustment instructions, as well as other association techniques such as the use of a "broker" mechanism or pattern matching (in particular for a complete sound scene), or similarity analysis.

In one possible embodiment, at least one of the mechanical members comprises at least two protrusions facing one another, so that the actuation of the member causes friction between the two protrusions, the friction producing a characteristic sound of the member.

This is an advantageous mechanical solution, requiring no supply of electricity, and the sound can be caused by simple actuation by a user.

In such an embodiment, one of the protrusions may comprise for example at least a first and a second resilient blade (for example metal blades as are found in a music box), different from one another, their respective positions offset relative to the other protrusion.

Thus, the actuation of the mechanical member in a first direction causes the vibration of the first blade then the second blade, producing a sound characteristic of the actuation of the member in the first direction, while the actuation of the mechanical member in a second direction causes the vibration of the second blade then the first blade, producing a sound characteristic of the actuation of the member in the second direction, typically the reverse of the first direction.

Such a simple embodiment allows determining, for example in the case of a switch, whether the associated device is being turned on or off.

Alternatively, for a potentiometer function for example, the mechanical member may comprise a first protrusion facing a plurality of successive protrusions, the friction of the first protrusion against all or part of the plurality of successive protrusions producing a sound characteristic of the actuation of the mechanical member.

In this case, the equipment item can be configured for analyzing the sound produced and for counting a number of protrusions, among the plurality of aforementioned protrusions, having rubbed the first protrusion, and deducing an adjustment amplitude of an instruction associated with the produced sound (for example in the abovementioned correlation table).

In one embodiment, the sound sensor may be an acoustic antenna for locating the origin of a sound and identifying a mechanical member that has emitted that sound.

Here, the term "acoustic antenna" means a set of piezoelectric capsules (such as an ambisonic microphone for example) to capture a sound with its direction of arrival and possibly to locate the different sound sources in a sound scene corresponding to the aforementioned sound environment. Such an embodiment advantageously makes it possible to determine, for example in the case of a plurality of switches having the same sound signature (for example because they are manufactured by the same industry), to distinguish between the different members according to their respective positions in the sound environment.

The invention also relates to a method for managing one or more devices connected to an equipment item in an environment, wherein the equipment item receives and interprets signals from the environment and, on the basis of an interpretation of the signals, transmits adjustment instructions to the devices. In particular, the environment is a sound environment and comprises one or more mechanical members which when actuated for the purpose of adjusting at least one of the devices, causes the emission of a characteristic sound. The equipment item is therefore connected to at least one sound sensor in order to:

receive sound signals from the environment, verify whether a received sound signal contains an acoustic signature of one of the mechanical members, and transmit at least one adjustment instruction for a device, based on the acoustic signature identified in the received sound signal.

As indicated above, one can:

compare each sound signal with predefined acoustic signatures in a correlation table, this correlation table listing adjustment instructions according to said acoustic signatures, and transmit at least one adjustment instruction for a device, based on at least one acoustic signature of the table, identified in a received sound signal.

In one embodiment, the method may comprise the following beforehand:

actuating each mechanical member and recording a set of parameters specific to the sound signal produced in the environment by the actuation of the mechanical member, and listing in the correlation table each set of parameters thus recorded, as an acoustic signature associated with the mechanical member that produced said sound signal in the environment.

Optionally, each mechanical member and the sound sensor may be arranged at respective fixed positions in the environment before recording the aforementioned sound signal parameters, in particular when it is desired to record among these parameters a direction of arrival of the sounds. Nevertheless, the detection of a sound signature defined for example by a temporal envelope and respective energies in selected frequency bands is usually sufficiently robust during movements of the source of this sound signature relative to a sensor.

In one embodiment, each acoustic signature of the correlation table can be defined by a set of parameters comprising at least one among a signal envelope over time and acoustic energy levels in respective chosen frequency bands. Thus, the equipment item, upon receiving a sound signal from the environment:

estimates an envelope over time for the signal and/or applies a time-frequency transform to the signal in order to determine acoustic energies in respective chosen frequency bands, and, from there, determines a set of parameters to be compared with sets of parameters of the acoustic signatures of the correlation table.

In one embodiment where the equipment item comprises a human-machine interface configured for receiving a corrective adjustment instruction as input, the equipment item can correct, by learning, the instructions listed in the correlation table on the basis of:

sounds received from the environment, and corrective adjustment instructions entered via the human/ machine interface within a period of time, from a received sound, below a threshold for example.

The present invention also relates to a computer program comprising instructions for implementing the above method, when these instructions are executed by a processor (as well as an information medium (a memory for example, such as a USB key or other) storing such instructions).

The present invention also relates to an equipment item of an installation described above, and comprising an interface for receiving sound signals from the environment, and a processing unit (typically for example a processor PROC cooperating with a memory MEM, and a communication interface COM, as illustrated in FIG. 1) in order to:

verify whether a received sound signal contains an acoustic signature of a mechanical member which when actuated for the purpose of adjusting a device, causes the emission of a characteristic sound, and transmit at least one adjustment instruction for the device, based on the acoustic signature identified in the received sound signal.

The present invention also relates to a mechanical member designed for implementation in an installation within the meaning of the invention, and whose actuation causes the emission of a characteristic sound. Exemplary embodiments of such members are described below with reference to FIGS. 4 and 5.

Other features and advantages of the invention will be apparent from reading the detailed description of some exemplary embodiments given below, and from examining the appended drawings, in which:

FIG. 1 schematically illustrates an exemplary installation within the meaning of the present invention;

FIG. 2 schematically illustrates the various steps of an exemplary method within the meaning of the present invention;

Figure 1:
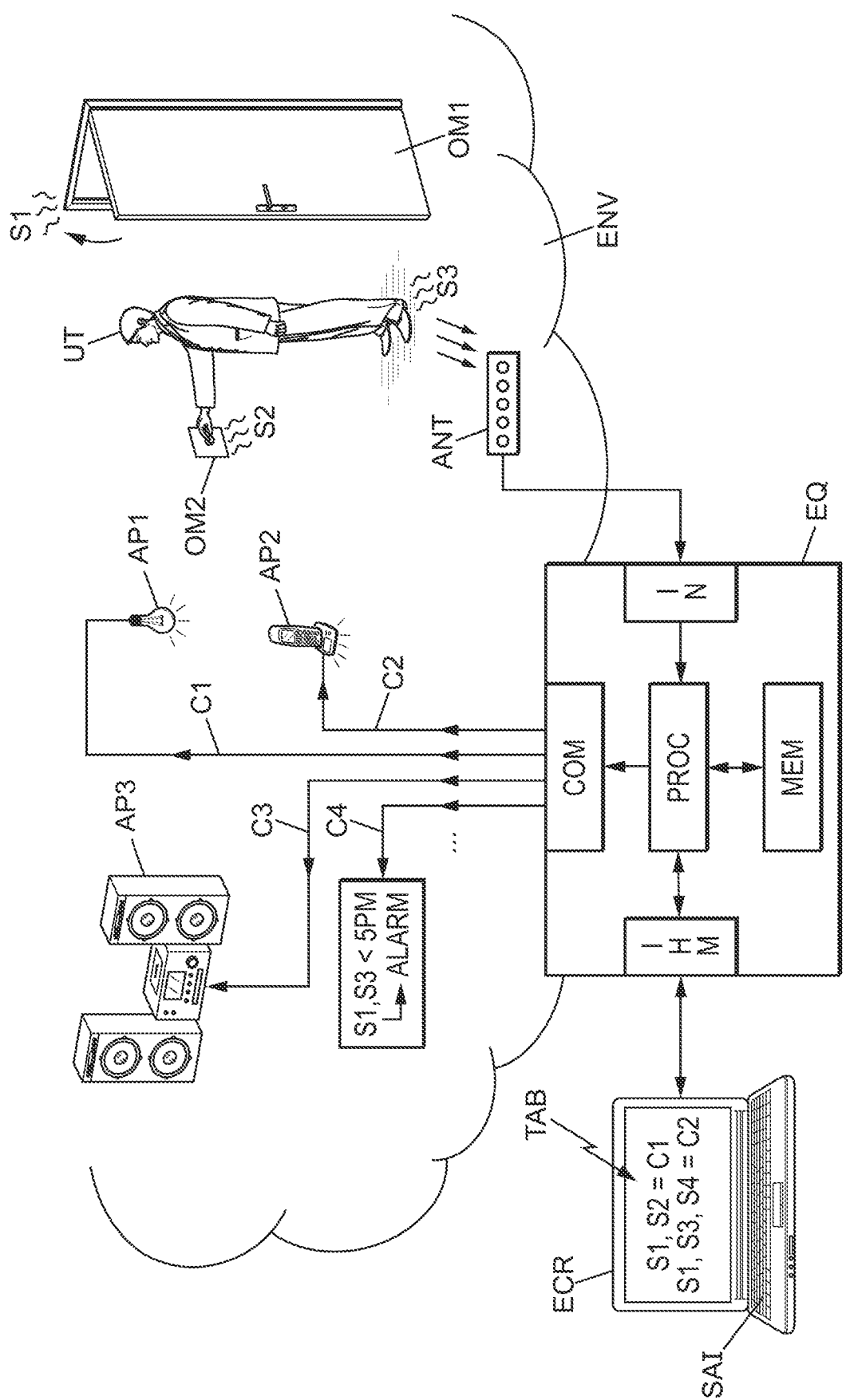

We first refer to FIG. 1 in which, in the example shown, a user UT is returning to his apartment. He activates a mechanical member OM1 consisting of the door of the apartment, by closing it, then activates a mechanical member OM2 consisting of a switch in order to turn on a device AP1 consisting of a light bulb at the entrance of his apartment.

In the example illustrated, the installation in the meaning of the invention comprises an acoustic antenna ANT, connected to an input interface IN of an equipment item EQ comprising a processing unit capable of generating control instructions C1, C2, C3, C4, . . . , intended for one or more devices AP1, AP2, AP3, . . . present in the apartment of the user UT (for example respectively the electric lamp AP1, an answering machine AP2, a stereo system AP3, etc.).

More particularly, the actuation of the mechanical members OM1, OM2 by the user UT produces characteristic sounds (respectively S1, S2) in the acoustic environment ENV of the user's apartment, these sounds S1, S2 being captured by the acoustic antenna ANT and interpreted by the equipment item EQ in order to deliver instructions adapted to the devices AP1, AP2, etc.

For example, here the actuation of the mechanical member OM2, typically in the form of a switch, produces a click or other noise S2 which is captured by the antenna ANT and interpreted by the equipment item EQ as actuation of the mechanical switch OM2 in order to turn on the electric bulb AP1 (instruction C1).

In the example shown, the entrance of the user UT into the apartment is acoustically expressed at least by:
the closure of the front door OM1 and the noise S1 thus generated, captured by the acoustic antenna ANT,
the activation of switch OM2 producing noise S2 (click or other as shown in the exemplary embodiment of FIG. 4 discussed below), captured by the acoustic antenna ANT.

For example, the sequence of sounds S1 and S2 (possibly with sound S3 between S1 and S2) is interpreted by the equipment item EQ as the arrival of the user in his apartment, so that the equipment item EQ can transmit a series of instructions C1, C2 and C3 to devices AP1, AP2, AP3: for example to turn on the light bulb AP1, read the telephone messages received by the answering machine AP2 in the absence of the user, and have the stereo system AP3 play preprogrammed welcoming music.

It should be noted that a captured and interpreted sound can be generated by an ad hoc mechanical member, designed specifically for the implementation of the invention, such as switch OM2, or by any conventional mechanical member producing a characteristic sound such as the closing of a front door or other. Thus, in the example illustrated in FIG. 1, the steps of the user UT produce a sound S3 that can be captured and interpreted as detecting a presence, typically.

The acoustic antenna ANT may comprise several piezoelectric capsules to capture different sounds in the environment, and to distinguish the directions from which these sounds arrive, thereby locating the sources having emitted these sounds. Such an embodiment typically makes it possible to distinguish between mechanical members (typically switches) emitting the same characteristic sound but at different locations.

It should further be noted that the choice of instructions C1, C2, . . . may not depend solely on the detection of predefined sounds (or a predefined sequence of sounds), but may be linked to other parameters. In the example of FIG. 1, the detection of sounds S1 and S3 can cause the user to be welcomed (with instructions C1 to C3 described above), or else can trigger an alarm according to instruction C4 if the detection of these sounds S1, S3 occurs within a predefined time slot (for example between nine a.m. and 5 p.m.).

Figure 2:
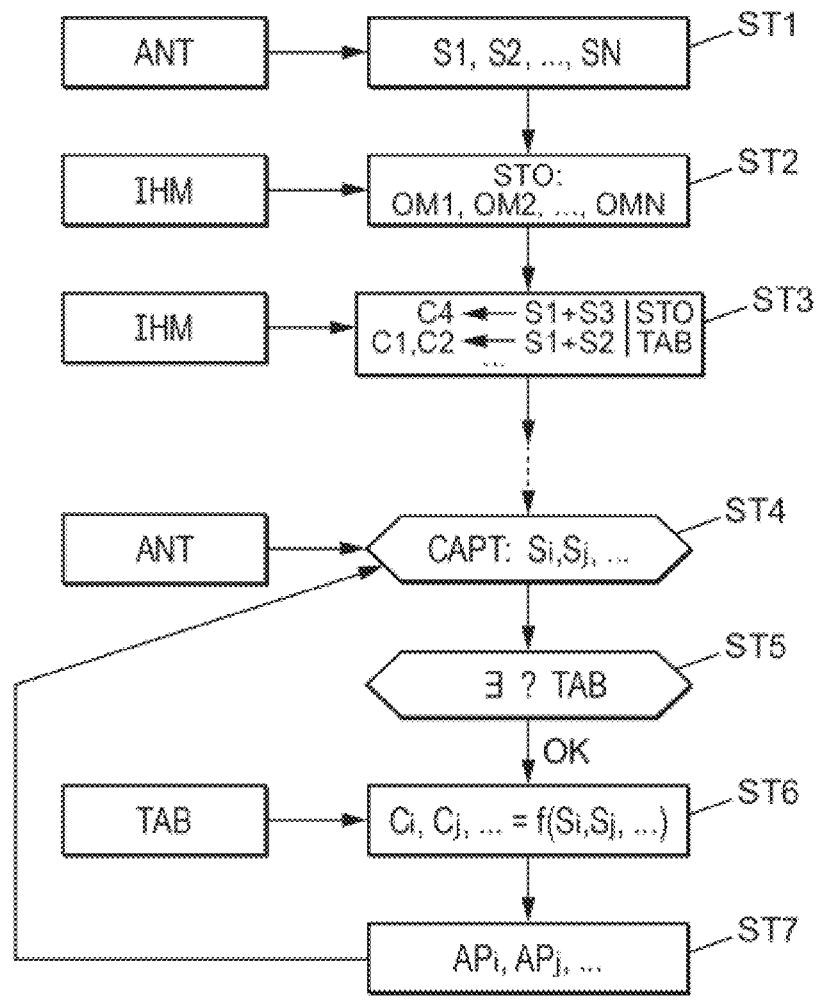
Figure 3:
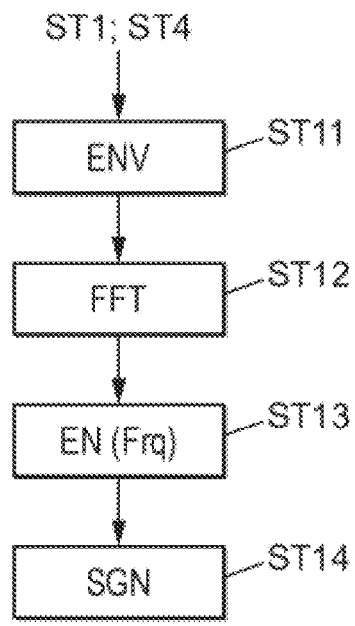
FIG. 3 illustrates details of FIG. 2 for the construction of a digital signature SGN from signals captured in the environment, this construction occurring in steps ST1 and ST4 of FIG. 2.

Of course, the choice of these different instructions can be configured by the user UT, for example via a human-machine interface IHM included in the equipment item EQ (connected for example to a display screen ECR and input means SAI, for example a touch screen of a tablet or other means). The user can thus construct a correlation table TAB between:
the different sounds detected in the acoustic environment (S1, S2); (S1, S2, S4); etc., possibly with a definition of the sequence of these sounds (for example sound S2 follows sound S1 within five seconds),
and different control instructions C1, C2, etc. for devices AP1, AP2, etc.;

The equipment item EQ may comprise, in addition to the interface IN for receiving the captured sound signals and this interface IHM, a processing unit typically comprising:
a communication interface COM for transmitting the instructions C1, C2, etc. to the different devices AP1, AP2, etc.;
a memory MEM typically storing the instruction data of a computer program in the meaning of the invention, as well as the data of the correlation table TAB for example (and possibly acoustic signatures making it possible to identify the sounds captured in the environment ENV, as described below with reference to FIGS. 2 and 3),
a processor PROC, cooperating with the memory MEM, in particular for reading the instructions of the computer program and executing the method of the invention, of which an exemplary embodiment is described below with reference to FIG. 2.

With reference to FIG. 2, during a first prior step ST1, the user himself mechanically activates the various members of the installation OM1, OM2, etc., so that the sounds produced by the mechanical members are captured by the acoustic antenna ANT. The user can also control, via the interface IHM, the storing in the memory MEM in step ST2 of the sounds thus captured, with correspondence for example to the different mechanical members associated with these sounds, for example:
S1: closure of the front door;
S2: entrance switch in "ON" mode;
S3: footsteps on the floor of the entrance; etc.

In the next step ST3, the user himself can define his correlation table TAB via the interface IHM, for example by assigning:
the alarm instruction C4 to the following succession of detected sounds: "closure of front door" and "sounds of footsteps at the entrance", without "activation of mechanical member OM2 at the entrance",
the succession of instructions C1, C2 (light in the entrance AP1, and playback of messages during absence AP2) to the following succession of detected sounds: "closure of front door" and "activation of mechanical member OM2 at the entrance", after 5 pm for example, Etc.

This correlation table TAB can then be stored in the memory MEM.

These steps ST1, ST2 and ST3 are prior to the current processing to be performed by the equipment item EQ, described below.

Next, if sound signals Si, Sj are captured in the environment by the antenna ANT in step ST4, in step ST5 the equipment item EQ determines whether these sound signals are similar to sounds previously saved in the memory MEM and present in the correlation table TAB, and in step ST6 determines where appropriate the instructions Ci, Cj, . . . associated with the detected sounds, or the sequence of detected sounds Si, Sj, etc., to transmit in step ST7 to the corresponding devices APi, APj, etc.

The sounds stored in the memory MEM can be in the form of sound files (way, mp3, or other format), or alternatively in the form of sets of parameters, each set characterizing a sound as an "acoustic signature" of an event (a set associated with the closing of the front door, a set associated with the activation of switch OM2, etc.). Each set may have parameters such as:
the definition of a temporal envelope (sound rise time, decay time, maximum amplitude relative to a reference, etc.),
the content (for example in energy and/or in energy variation) in successive chosen frequency bands,
the direction of arrival of the sound (detected by means of the antenna), and/or other acoustic parameters.

With reference to FIG. 3, it is then possible to have these parameters be obtained after capturing the sound signals in steps ST1 and ST4, by determining the temporal envelope of the sound signal in step ST11, by applying a Fourier transform (FFT type) in step ST12 typically in order to determine a frequency band energy distribution frq in step ST13.

Such parameters characterize the sound captured, which enables assigning it in step ST14 to an acoustic signature SGN which can be listed in the correlation table TAB.

Such parameters defining the sound signature of an event provide robust detection of the event, such that the sounds can be recognized even in a noisy environment (with voices or other noises that are not necessarily listed in the table TAB).

Of course, the design of the ad hoc mechanical members for controlling a device, via a sound wave, can be chosen to offer optimized acoustic signatures.

Thus, with reference to FIG. 4, it is possible to provide a binary switch in "ON" or "OFF" mode, which when mechanically actuated by a user (arrow DUT) produces a characteristic sound, as follows. The switch comprises:
- a protrusion P1, able to be driven by the mechanical actuation DUT,
- two elastic blades L1 and L2, for example metal (as in a music box), carried by another protrusion P2 facing the first protrusion P1.

In particular, the two blades L1 and L2 are different (for example of different thicknesses).

Thus, when protrusion P1 moves upwards (in the example of FIG. 4), blade L1 vibrates before blade L2, which produces a characteristic sequence of sounds corresponding to this succession of vibrations defining the "ON" mode of the switch, in the table TAB.

Conversely, when protrusion P1 moves downwards, blade L1 vibrates after blade L2, which produces a characteristic sequence of sounds defining the "OFF" mode of the switch, in the table TAB.

Figure 5:
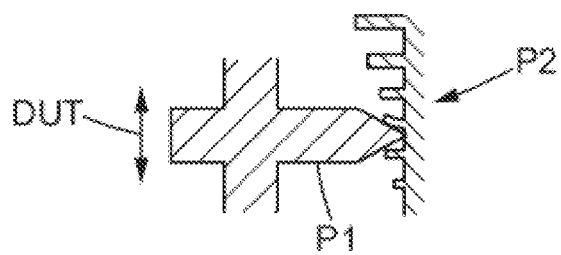
FIG. 5 illustrates an exemplary embodiment of a potentiometer type of mechanical member.

FIG. 5 illustrates an embodiment in which the mechanical member is a potentiometer and comprises protrusion P1, this time facing a succession of distinct resilient blades (metal for example) carried by a second protrusion P2. Thus, downward movement of protrusion P1 relative to protrusion P2 (down arrow DUT of FIG. 5) produces a succession of characteristic sounds that are increasingly high-pitched (for example to increase the amplitude of an adjustment, typically such as the volume of the stereo system), while upward movement of protrusion P1 relative to protrusion P2 (up arrow DUT of FIG. 5) produces a succession of increasingly low-pitched characteristic sounds (for example to decrease the volume of the stereo system).

Of course, the present invention is not limited to the embodiments described above by way of example; it extends to other variants.

Figure 4:
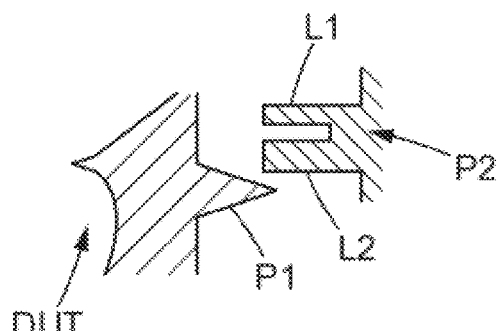
FIG. 4 illustrates an exemplary embodiment of a switch type of mechanical member.

Thus, it will be understood that the mechanical members represented as responding to a linear adjustment in FIGS. 4 and 5 may alternatively be rotating members.

Furthermore, instructions other than those illustrated by way of example in FIG. 1 may be provided in accordance with the application of the invention. For example, the installation may be set up in an environment different from that of an apartment, and for example in an industrial plant where detected characteristic sounds (different noise of a drill in different material, for example) can trigger specific device actions (stopping the rotation of the drill).

The invention claimed is:

1. An installation for managing at least one device connected to an equipment item in an environment, wherein the equipment item receives and interprets signals from the environment and, based on an interpretation of the signals, transmits adjustment instructions to the devices,
    wherein the installation further comprises at least one sound sensor connected to the equipment item, and at least one mechanical member which, when mechanically actuated to adjust at least one of the devices, causes the emission of a characteristic sound, and
    wherein the equipment item is arranged to:
        receive sound signals from the environment,
        verify whether a received sound signal contains an acoustic signature of the mechanical member, and
        transmit at least one adjustment instruction for a device based on the acoustic signature identified in the received sound signal, and
    wherein the at least one mechanical member comprises at least two protrusions facing one another, the actuation of the member causing friction between the two protrusions, the friction producing a characteristic sound of the member.

2. The installation according to claim 1, wherein one of the protrusions comprises at least a first and a second resilient blade, different from one another, their respective positions offset relative to the other protrusion, and the actuation of the mechanical member in a first direction causes the vibration of the first blade then the second blade, producing a sound characteristic of the actuation of the member in the first direction, while the actuation of the mechanical member in a second direction causes the vibration of the second blade then the first blade, producing a sound characteristic of the actuation of the member in the second direction.

3. The installation according to claim 1, wherein the mechanical member comprises a first protrusion facing a plurality of successive protrusions, the friction of the first protrusion against all or part of the plurality of successive protrusions producing a sound characteristic of the actuation of the mechanical member.

4. The installation according to claim 3, wherein the equipment item is configured for analyzing the sound produced and for counting a number of protrusions, among said plurality of protrusions, having rubbed the first protrusion, and deducing an adjustment amplitude of an instruction associated with the produced sound.

5. The installation according to claim 1, wherein the sound sensor is an acoustic antenna for locating the origin of a sound and identifying a mechanical member that has emitted the sound.

6. A method for managing one or more devices connected to an equipment item in an environment, wherein the equipment item receives and interprets signals from the environment and, on the basis of an interpretation of the signals, transmits adjustment instructions to the devices,
    wherein the environment is a sound environment and comprises at least one mechanical member which, when mechanically actuated to adjust at least one of the devices, causes the emission of a characteristic sound, and
    wherein the equipment item is connected to at least one sound sensor in order to:
        receive sound signals from the environment,
        verify whether a received sound signal contains an acoustic signature of one of the mechanical members, and
        transmit at least one adjustment instruction for a device, based on the acoustic signature identified in the received sound signal, and
        wherein the at least one mechanical member comprises at least two protrusions facing one another, the actuation of the member causing friction between the two protrusions, the friction producing a characteristic sound of the member.

7. The method according to claim 6, wherein each received sound signal is compared with predefined acoustic signatures in a correlation table, the correlation table listing adjustment instructions according to with said acoustic signatures, and wherein at least one adjustment instruction for a device is transmitted, based on at least one acoustic signature of the table identified in a received sound signal.

8. The method according to claim 7, wherein the method further comprises:
- actuating each mechanical member and recording a set of parameters specific to the sound signal produced in the environment by actuation of the mechanical member, and
- listing in the correlation table each set of parameters thus recorded, as an acoustic signature associated with the mechanical member that produced said sound signal in the environment.

9. The method according to claim 7, wherein each acoustic signature of the correlation table is defined by a set of parameters comprising at least one among a signal envelope over time and acoustic energy levels in respective chosen frequency bands, and wherein the equipment item, upon receiving a sound signal from the environment:
- estimates an envelope over time for the signal and/or applies a time-frequency transform to the signal in order to determine acoustic energies in respective chosen frequency bands, and
- from there, determines a set of parameters to be compared with sets of parameters of the acoustic signatures of the correlation table.

10. The method according to claim 7, wherein, the equipment item comprising a human-machine interlace configured for receiving a corrective adjustment instruction as input, the equipment corrects, by learning, the instructions listed in the correlation table on the basis of:
- sounds received from the environment, and
- corrective adjustment instructions entered via the human/machine interface within a period of time, from a received sound, below a threshold.

11. A non-transitory computer-readable storage medium with a program stored thereon, the program comprising instruction code stored on the computer-readable storage medium for executing the method according to claim 6.

* * * * *

UNITED STATES PATENT AND TRADEMARK OFFICE
CERTIFICATE OF CORRECTION

| | |
|---|---|
| PATENT NO. | : 10,978,092 B2 |
| APPLICATION NO. | : 16/458921 |
| DATED | : April 13, 2021 |
| INVENTOR(S) | : Ottogalli et al. |

It is certified that error appears in the above-identified patent and that said Letters Patent is hereby corrected as shown below:

In the Specification

Column 5, Line 57, delete "etc.;" and insert --etc.--.

Column 6, Line 48, delete "way" and insert --wav--.

In the Claims

Column 10, Line 10, Claim 10, delete "interlace" and insert --interface--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*